US011006185B2

(12) United States Patent
Xiong et al.

(10) Patent No.: US 11,006,185 B2
(45) Date of Patent: May 11, 2021

(54) VIDEO SERVICE QUALITY ASSESSMENT METHOD AND APPARATUS (71) Applicant: Huawei Technologies Co., Ltd., Guangdong (CN)

(72) Inventors: Jie Xiong, Nanjing (CN); Youqing Yang, Shenzhen (CN); Qiujie Fu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/221,011

(22) Filed: Dec. 14, 2018

(65) Prior Publication Data
US 2019/0124408 A1 Apr. 25, 2019

Related U.S. Application Data (63) Continuation of application No. PCT/CN2017/087994, filed on Jun. 13, 2017.

(30) Foreign Application Priority Data

Jun. 16, 2016 (CN) .......................... 201610430541.7

(51) Int. Cl.
G06F 15/16 (2006.01)
H04N 21/647 (2011.01)
(Continued)

(52) U.S. Cl.
CPC ... H04N 21/64738 (2013.01); H04L 65/4076 (2013.01); H04L 65/4084 (2013.01);
(Continued)

(58) Field of Classification Search
USPC ........................................................ 709/231
See application file for complete search history.

(56) References Cited

U.S. PATENT DOCUMENTS 6,501,763 B1 * 12/2002 Bhagavath .......... H04L 12/1827
370/401
6,567,929 B1 * 5/2003 Bhagavath ............ H04L 12/185
370/432
(Continued)

FOREIGN PATENT DOCUMENTS

CN 101127702 A 2/2008
CN 101179353 A 5/2008
(Continued)

OTHER PUBLICATIONS

Machine Translation and Abstract of Chinese Japanese Publication No. JP2001007848, Jan. 12, 2001, 11 pages.
(Continued)

Primary Examiner — Anthony Mejia
(74) Attorney, Agent, or Firm — Conley Rose, P.C.

(57) ABSTRACT

A video service quality assessment method and apparatus are provided to resolve a prior-art problem of relatively low accuracy of an assessment result. A monitoring device obtains an identifier of a to-be-monitored channel, an identifier of to-be-monitored user equipment, and configuration information of a video service transmission system; obtains a multicast video stream of the to-be-monitored channel based on the identifier of the to-be-monitored channel; obtains a retransmitted video stream based on the identifier of the to-be-monitored channel, the identifier of the to-be-monitored user equipment, and the configuration information of the video service transmission system; determines a to-be-assessed video stream based on the multicast video stream and the retransmitted video stream; and parses the to-be-assessed video stream, and obtains an assessment result based on a parsing result and the configuration information of the video service transmission system.

17 Claims, 6 Drawing Sheets (51) Int. Cl.
*H04N 21/24* (2011.01)
*H04N 21/643* (2011.01)
*H04N 17/00* (2006.01)
*H04N 21/6437* (2011.01)
*H04N 21/6405* (2011.01)
*H04L 29/06* (2006.01)
*H04N 21/234* (2011.01)
*H04N 21/44* (2011.01)

(52) U.S. Cl.
CPC ........... *H04L 65/608* (2013.01); *H04L 65/80* (2013.01); *H04N 17/00* (2013.01); *H04N 17/004* (2013.01); *H04N 21/23406* (2013.01); *H04N 21/2401* (2013.01); *H04N 21/44004* (2013.01); *H04N 21/6405* (2013.01); *H04N 21/647* (2013.01); *H04N 21/6437* (2013.01); *H04N 21/6473* (2013.01); *H04N 21/64322* (2013.01); *H04N 21/64776* (2013.01)

(56) References Cited

U.S. PATENT DOCUMENTS

| | | | |
|---|---|---|---|
| 7,724,640 B2* | 5/2010 | Larsson | H04L 1/1867 370/216 |
| 8,379,083 B1* | 2/2013 | Jafari | H04N 7/185 348/143 |
| 2002/0021700 A1* | 2/2002 | Hata | H04L 1/1628 370/395.42 |
| 2003/0033487 A1* | 2/2003 | Pfister | G06F 12/0817 711/144 |
| 2004/0006643 A1* | 1/2004 | Dolson | H04L 67/2804 709/246 |
| 2004/0078624 A1* | 4/2004 | Maxemchuk | H04L 12/1886 714/4.2 |
| 2004/0177377 A1* | 9/2004 | Lin | H04L 29/06027 725/81 |
| 2007/0047542 A1* | 3/2007 | Thukral | H04L 43/0811 370/389 |
| 2007/0058043 A1* | 3/2007 | Thukral | H04N 17/004 348/180 |
| 2007/0097982 A1* | 5/2007 | Wen | H04L 47/32 370/394 |
| 2007/0268836 A1* | 11/2007 | Byun | H04L 43/00 370/252 |
| 2008/0056302 A1* | 3/2008 | Erdal | H04L 29/06027 370/474 |
| 2008/0235722 A1* | 9/2008 | Baugher | H04N 7/1675 725/32 |
| 2008/0239062 A1* | 10/2008 | Civanlar | H04N 7/152 348/14.09 |
| 2009/0138932 A1 | 5/2009 | Bauchot et al. | |
| 2009/0225671 A1* | 9/2009 | Arbel | H04L 43/00 370/252 |
| 2009/0254952 A1 | 10/2009 | Sridhar et al. | |
| 2009/0319612 A1 | 12/2009 | Matsuo | |
| 2010/0138885 A1* | 6/2010 | Haimi-Cohen | H04N 21/6437 725/109 |
| 2010/0214970 A1 | 8/2010 | Brunner et al. | |
| 2011/0310726 A1* | 12/2011 | Di | H04N 21/482 370/216 |
| 2013/0003579 A1* | 1/2013 | Lu | H04N 21/23432 370/252 |
| 2013/0007109 A1 | 1/2013 | Matsuhira | |
| 2013/0163444 A1* | 6/2013 | Tee | H04W 72/005 370/252 |
| 2013/0170391 A1* | 7/2013 | Feiten | H04N 17/004 370/252 |
| 2013/0182557 A1* | 7/2013 | Zhang | H04N 21/6408 370/216 |
| 2013/0191628 A1* | 7/2013 | Nedeltchev | H04L 69/22 713/153 |
| 2014/0020004 A1* | 1/2014 | Hu | H04N 21/2407 725/14 |
| 2014/0341288 A1* | 11/2014 | Wu | H04N 19/109 375/240.16 |
| 2014/0369249 A1* | 12/2014 | Mikhailov | H04W 4/06 370/312 |
| 2015/0009989 A1* | 1/2015 | Han | H04L 12/1868 370/390 |
| 2015/0052246 A1 | 2/2015 | Kordasiewicz et al. | |
| 2015/0098352 A1* | 4/2015 | Froehlich | H04L 41/5009 370/252 |
| 2015/0281306 A1* | 10/2015 | Barak | H04N 21/6582 725/93 |
| 2015/0326898 A1* | 11/2015 | Yang | H04N 21/437 725/9 |
| 2017/0054770 A1* | 2/2017 | Wells | H04L 65/1006 |
| 2017/0303159 A1* | 10/2017 | Ma | H04W 28/0289 |
| 2017/0366672 A1* | 12/2017 | Newman | H04L 65/1013 |
| 2018/0007395 A1* | 1/2018 | Ugur | H04N 21/4384 |

FOREIGN PATENT DOCUMENTS

| | | |
|---|---|---|
| CN | 101656747 A | 2/2010 |
| CN | 102143388 A | 8/2011 |
| CN | 102651821 A | 8/2012 |
| CN | 103119895 A | 5/2013 |
| CN | 103166808 A | 6/2013 |
| CN | 104661021 A | 5/2015 |
| EP | 1993233 A1 | 11/2008 |
| EP | 2432161 A1 | 3/2012 |
| JP | 2001007848 A | 1/2001 |
| JP | 2008269195 A | 11/2008 |
| JP | 2010004221 A | 1/2010 |
| JP | 2010539763 A | 12/2010 |
| JP | 2011061533 A | 3/2011 |
| JP | 2011519511 A | 7/2011 |
| JP | 2011223278 A | 11/2011 |
| JP | 2013541281 A | 11/2013 |
| JP | 2014132703 A | 7/2014 |
| JP | 2016006673 A | 1/2016 |
| WO | 2011083567 A1 | 7/2011 |

OTHER PUBLICATIONS

Machine Translation and Abstract of Chinese Japanese Publication No. JP2008269195, Nov. 6, 2008, 11 pages.
Machine Translation and Abstract of Chinese Japanese Publication No. JP2011061533, Mar. 24, 2011, 33 pages.
Machine Translation and Abstract of Chinese Japanese Publication No. JP2011223278, Nov. 4, 2011, 49 pages.
Machine Translation and Abstract of Chinese Japanese Publication No. JP2013541281, Nov. 7, 2013, 14 pages.
Machine Translation and Abstract of Chinese Japanese Publication No. JP2014132703, Jul. 17, 2014, 63 pages.
Machine Translation and Abstract of Chinese Japanese Publication No. JP2016006673, Jan. 14, 2016, 46 pages.
Foreign Communication From a Counterpart Application, Japanese Application No. 2018-565648, Japanese Office Action dated Jan. 14, 2020, 4 pages.
Foreign Communication From a Counterpart Application, Japanese Application No. 2018-565648, English Translation of Japanese Office Action dated Jan. 14, 2020, 6 pages.
J. Ott, et al., "Extended RTP Profile for Real-time Transport Control Protocol (RTCP)—Based Feedback (RTP/AVPF)," Network Working Group, Request for Comments: 4585, Category: Standards Track, Jul. 2006, 51 pages.
J. Rey, et al., "RTP Retransmission Payload Format," Network Working Group, Request for Comments: 4588, Category: Standards Track, Jul. 2006, 35 pages.
International Telecommunication Union, ITU-T, P.1201.2 (Oct. 2012), Series P: Terminals and Subjective and Objective Assessment Methods, Models and tools for quality assessment of streamed media, Parametric non-intrusive assessment of audiovisual media streaming quality—Higher resolution application area, Oct. 2012, 56 pages.
International Telecommunication Union, ITU-T P.910 (Apr. 2008), Series P: Telephone Transmission Quality, Telephone Installations, (56) References Cited

OTHER PUBLICATIONS

Local Line Networks, Audiovisual quality in multimedia services, Subjective video quality assessment methods for multimedia applications, Apr. 2008, 42 pages.

"TVQM Video Quality Metrics," Telchemy Application Note, Feb. 2008, 10 pages.

\* cited by examiner

VIDEO SERVICE QUALITY ASSESSMENT METHOD AND APPARATUS

CROSS-REFERENCE TO RELATED APPLICATIONS

This application is a continuation of International Application No. PCT/CN2017/087994, filed on Jun. 13, 2017, which claims priority to Chinese Patent Application No. 201610430541.7, filed on Jun. 16, 2016. The disclosures of the aforementioned applications are hereby incorporated by reference in their entireties.

TECHNICAL FIELD

The present application relates to the field of communications technologies, and in particular, to a video service quality assessment method and apparatus.

BACKGROUND

Currently, an Internet Protocol television (IPTV) video service is independently operated and controlled by a telecommunications operator. A user pays the telecommunications operator money, and the telecommunications operator provides the user with an IPTV video headend, a content delivery network (CDN), a set-top box (STB), another network device ensuring normal running of the IPTV video service, and the like, and is responsible for paid content of the user and IPTV video service quality.

The mean opinion score of video (MOS-V) is an assessment criterion for measuring IPTV video service quality. This standard is used to detect a program source compression impairment and a network transmission impairment of a received video, and perform integrated modeling-based scoring on impact of these impairments on video watching experience of a user based on a specific scoring criterion. The IPTV video service quality can be determined based on a scoring result.

In the prior art, video service quality is specifically accessed by using the MOS-V in the following specific implementation solution: A video service quality assessment device is deployed in a network. The device captures a multicast video stream, parses a video-related parameter, calculates video content complexity and a quantity of bits per pixel, and assesses an impairment of compression coding on video quality, namely, a video compression artefacts. Then the device collects statistics on a video packet loss status, and assesses a network transmission error of the packet loss on video quality by using different models for different error concealment manners. Finally, the device comprehensively considers the video compression impairment and the network transmission impairment to obtain a final MOS-V.

In actual application, a telecommunications operator often uses a series of assurance mechanisms, such as an error recovery mechanism and a buffer mechanism used to improve a packet loss error tolerance capability of an IPTV system, so as to improve IPTV video service quality. Because in the prior art, these assurance mechanisms are not considered in this specific implementation solution for assessing video service quality by using the MOS-V, the obtained video compression impairment and network transmission impairment cannot reflect a real network status, and consequently an assessment result obtained through MOS-V-based video quality assessment has relatively low accuracy.

SUMMARY

The present disclosure provides a video service quality assessment method and apparatus, so as to resolve a prior-art problem that an obtained video compression impairment and network transmission impairment cannot reflect a real network status, and consequently an assessment result obtained through MOS-V-based video quality assessment has relatively low accuracy.

According to a first aspect, the present disclosure provides a video service quality assessment method, where the method includes: obtaining an identifier of a to-be-monitored channel, an identifier of to-be-monitored user equipment, and configuration information of a video service transmission system; obtaining a multicast video stream of the to-be-monitored channel based on the identifier of the to-be-monitored channel; obtaining, based on the identifier of the to-be-monitored channel and the identifier of the to-be-monitored user equipment, a video stream that is of the to-be-monitored channel and that needs to be retransmitted; obtaining a retransmitted video stream of the to-be-monitored channel based on the identifier of the to-be-monitored channel, the identifier of the to-be-monitored user equipment, and the configuration information of the video service transmission system; determining a to-be-assessed video stream based on the multicast video stream and at least one of the video stream that needs to be retransmitted and the retransmitted video stream; and parsing the to-be-assessed video stream, and obtaining an assessment result based on a parsing result and the configuration information of the video service transmission system.

According to the video service quality assessment method provided in the present disclosure, in a process of determining the to-be-assessed video stream, not only the multicast video stream is obtained, but also the video stream that needs to be retransmitted and the retransmitted video stream are obtained, and the final video stream used for quality assessment is determined based on the multicast video stream and the at least one of the video stream that needs to be retransmitted and the retransmitted video stream. In the prior art, only a multicast video stream is obtained. By comparison, according to the video service quality assessment method provided in the present disclosure, the at least one of the video stream that needs to be retransmitted and the retransmitted video stream is further considered, and the to-be-assessed video stream can truly reflect a status of receiving a video stream by the user equipment. Therefore, the assessment result obtained based on the to-be-assessed video stream is also relatively accurate.

With reference to the first aspect, in a first implementation of the first aspect, the obtaining, based on the identifier of the to-be-monitored channel and the identifier of the to-be-monitored user equipment, a video stream that is of the to-be-monitored channel and that needs to be retransmitted includes: obtaining, based on the identifier of the to-be-monitored channel and the identifier of the to-be-monitored user equipment, a retransmission request corresponding to the to-be-monitored channel that is sent by the to-be-monitored user equipment, where the retransmission request includes an identifier of a packet that needs to be retransmitted; and obtaining, based on the identifier of the packet that needs to be retransmitted, the video stream that needs to be retransmitted.

In this implementation, the video stream that needs to be retransmitted, to be specific, a packet that is not successfully received by the to-be-monitored user equipment, may be obtained based on the retransmission request corresponding to the to-be-monitored channel that is sent by the to-be-monitored user equipment. Therefore, a video stream actually received on a user equipment side in a multicast mode can be determined based on the obtained multicast video stream and video stream that needs to be retransmitted.

With reference to the first aspect, in a second implementation of the first aspect, the configuration information of the video service transmission system includes an identifier of each device in the video service transmission system; the method further includes: determining, based on the configuration information of the video service transmission system, whether the video service transmission system includes a retransmission server; if the video service transmission system includes the retransmission server, the method further includes: obtaining an identifier of the retransmission server; and the obtaining a retransmitted video stream of the to-be-monitored channel based on the identifier of the to-be-monitored channel, the identifier of the to-be-monitored user equipment, and the configuration information of the video service transmission system specifically includes: obtaining, based on the identifier of the to-be-monitored channel, the identifier of the to-be-monitored user equipment, and the identifier of the retransmission server, a retransmitted packet sent by the retransmission server to the to-be-monitored user equipment; and determining the retransmitted packet as the retransmitted video stream.

In this implementation, it may be determined, by using the configuration information of the video service transmission system, whether the retransmission server exists in the system. If the retransmission server exists, a packet received by the to-be-monitored user equipment through retransmission, that is, the retransmitted video stream, may be determined based on the retransmitted packet sent by the retransmission server to the to-be-monitored user equipment; or if the retransmission server does not exist, there is no retransmitted video stream. In this way, the to-be-assessed video stream is determined by considering a video stream received through retransmission in addition to a video stream received in a multicast mode. The to-be-assessed video stream determined in this way can truly reflect a video stream actually received on a user equipment side, and the assessment result obtained based on the video stream is also relatively accurate.

With reference to the second implementation of the first aspect, in a third implementation of the first aspect, the identifier of the to-be-monitored user equipment is an IP address of the to-be-monitored user equipment, and the identifier of the retransmission server is an IP address of the retransmission server; and if the retransmission server and another device have a same IP address, the obtaining, based on the identifier of the to-be-monitored channel, the identifier of the to-be-monitored user equipment, and the identifier of the retransmission server, a retransmitted packet sent by the retransmission server to the to-be-monitored user equipment specifically includes: determining, based on the identifier of the to-be-monitored channel, the IP address of the to-be-monitored user equipment, the IP address of the retransmission server, and an encapsulation format of a packet used to transmit a video stream, the retransmitted packet sent by the retransmission server to the to-be-monitored user equipment.

In this implementation, when the retransmission server and the another device have the same IP address, for example, when the retransmission server and the another device are disposed in an integrated manner, or the retransmission server and the another device are implemented by using a same physical device, the retransmitted packet needs to be identified based on the encapsulation format of the retransmitted packet in addition to a source IP address (the IP address of the retransmission server) and a destination IP address (the IP address of the to-be-monitored user equipment) included in the packet, so as to distinguish between packets from the another device and the retransmission server.

With reference to any one of the first aspect, and the first to the third implementations of the first aspect, in a fourth implementation of the first aspect, the configuration information of the video service transmission system includes a buffer capacity of the to-be-monitored user equipment; and before the obtaining a multicast video stream, a video stream that needs to be retransmitted, and a retransmitted video stream of the to-be-monitored channel, the method further includes: disposing a buffer based on the buffer capacity of the to-be-monitored user equipment, where the buffer is configured to buffer the multicast video stream and the retransmitted video stream.

In this implementation, the buffer is disposed based on the buffer capacity of the to-be-monitored user equipment, and is configured to buffer the obtained multicast video stream and retransmitted video stream, so as to simulate a buffer mechanism of the to-be-monitored user equipment. Therefore, in this implementation, the buffer mechanism of the to-be-monitored user equipment is considered in the video service quality assessment method provided in the present disclosure. Therefore, the status of receiving a video stream on the to-be-monitored user equipment side can be more truly reflected, so that accuracy of the assessment result can be further improved.

According to a second aspect, an embodiment of the present disclosure provides a video service quality assessment apparatus, where the apparatus includes: an obtaining module, configured to obtain an identifier of a to-be-monitored channel, an identifier of to-be-monitored user equipment, and configuration information of a video service transmission system; and a processing module, configured to: obtain a multicast video stream of the to-be-monitored channel based on the identifier of the to-be-monitored channel; obtain, based on the identifier of the to-be-monitored channel and the identifier of the to-be-monitored user equipment, a video stream that is of the to-be-monitored channel and that needs to be retransmitted; obtain a retransmitted video stream of the to-be-monitored channel based on the identifier of the to-be-monitored channel, the identifier of the to-be-monitored user equipment, and the configuration information of the video service transmission system; determine a to-be-assessed video stream based on the multicast video stream and at least one of the video stream that needs to be retransmitted and the retransmitted video stream; and parse the to-be-assessed video stream, and obtain an assessment result based on a parsing result and the configuration information of the video service transmission system.

According to the video service quality assessment apparatus provided in the present disclosure, when determining the to-be-assessed video stream, the processing module not only obtains the multicast video stream, but also obtains the at least one of the video stream that needs to be retransmitted and the retransmitted video stream, and determines, based on the multicast video stream and the at least one of the video stream that needs to be retransmitted and the retransmitted video stream, the final video stream used for quality assessment. In the prior art, only a multicast video stream is obtained. By comparison, the video service quality assessment apparatus provided in the present disclosure further considers the at least one of the video stream that needs to be retransmitted and the retransmitted video stream, and the to-be-assessed video stream can truly reflect a status of receiving a video stream by the user equipment. Therefore, the assessment result obtained based on the to-be-assessed video stream is also relatively accurate.

With reference to the second aspect, in a first implementation of the second aspect, the processing module is specifically configured to: obtain, based on the identifier of the to-be-monitored channel and the identifier of the to-be-monitored user equipment, a retransmission request corresponding to the to-be-monitored channel that is sent by the to-be-monitored user equipment, where the retransmission request includes an identifier of a packet that needs to be retransmitted; and obtain, based on the identifier of the packet that needs to be retransmitted, the video stream that needs to be retransmitted.

With reference to the second aspect, in a second implementation of the second aspect, the processing module is further configured to: when the configuration information of the video service transmission system includes an identifier of each device in the video service transmission system, determine, based on the configuration information of the video service transmission system, whether the video service transmission system includes a retransmission server; when the video service transmission system includes the retransmission server, obtain an identifier of the retransmission server; obtain, based on the identifier of the to-be-monitored channel, the identifier of the to-be-monitored user equipment, and the identifier of the retransmission server, a retransmitted packet sent by the retransmission server to the to-be-monitored user equipment; and determine the retransmitted packet as the retransmitted video stream.

With reference to the second implementation of the second aspect, in a third implementation of the second aspect, the processing module is further configured to: when the identifier of the to-be-monitored user equipment is an IP address of the to-be-monitored user equipment, the identifier of the retransmission server is an IP address of the retransmission server, and the retransmission server and another device have a same IP address, determine, based on the identifier of the to-be-monitored channel, the IP address of the to-be-monitored user equipment, the IP address of the retransmission server, and an encapsulation format of a packet used to transmit a video stream, the retransmitted packet sent by the retransmission server to the to-be-monitored user equipment.

With reference to any one of the second aspect, and the first to the third implementations of the second aspect, in a fourth implementation of the second aspect, the processing module is further configured to: when the configuration information of the video service transmission system includes a buffer capacity of the to-be-monitored user equipment, dispose a buffer based on the buffer capacity of the to-be-monitored user equipment, where the buffer is configured to buffer the multicast video stream and the retransmitted video stream.

According to a third aspect, an embodiment of the present disclosure provides a video service quality assessment apparatus, where the apparatus includes a transmitter, a receiver, a memory, a processor, and a bus; the transmitter, the receiver, the memory, and the processor are connected to each other by using the bus; the transmitter is configured to send data to another device under the control of the processor; the receiver is configured to receive, under the control of the processor, data sent by the another device; the memory is configured to store program code; and the processor is configured to execute the program code, so as to implement the method according to any one of the first aspect and the implementations of the first aspect.

When determining a to-be-assessed video stream, the video service quality assessment apparatus provided in the present disclosure not only obtains a multicast video stream, but also obtains at least one of a video stream that needs to be retransmitted and a retransmitted video stream, and determines, based on the multicast video stream and the at least one of the video stream that needs to be retransmitted and the retransmitted video stream, the final video stream used for quality assessment. In the prior art, only a multicast video stream is obtained. By comparison, the video service quality assessment apparatus provided in the present disclosure further considers the at least one of the video stream that needs to be retransmitted and the retransmitted video stream, and the to-be-assessed video stream can truly reflect a status of receiving a video stream by user equipment. Therefore, an assessment result obtained based on the to-be-assessed video stream is also relatively accurate.

BRIEF DESCRIPTION OF DRAWINGS

To describe the technical solutions in the embodiments of the present disclosure or in the prior art more clearly, the following briefly describes the accompanying drawings required for describing the embodiments.

DESCRIPTION OF EMBODIMENTS

The following describes the technical solutions in the embodiments with reference to the accompanying drawings in the embodiments.

Figure 1:
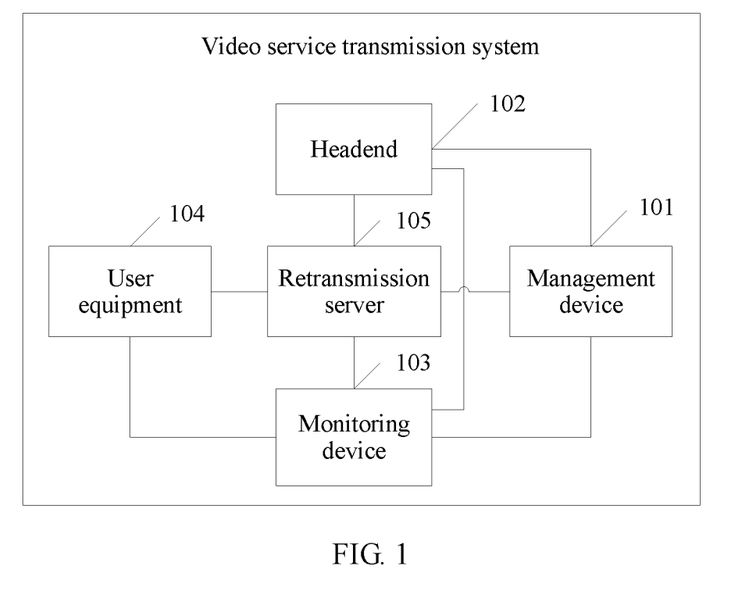
FIG. 1 is a schematic architectural diagram of a video service transmission system according to an embodiment of the present disclosure.

As shown in FIG. 1, an embodiment of the present disclosure provides a video service transmission system. The system includes a management device 101, a headend 102, a monitoring device 103, and user equipment 104. The management device 101 is configured to manage, configure, and monitor a running status of each device in the video service transmission system and a video stream transmission status. In this embodiment of the present disclosure, the management device is further configured to send a monitoring instruction to the monitoring device. The headend 102 is configured to: encode a to-be-transmitted video service, push a video stream, and the like. The monitoring device 103 is configured to monitor, according to the monitoring instruction of the management device 101, quality of a video stream transmitted in a network, and may be specifically a monitoring device shown in FIG. 6. The user equipment 104 is a device on a user side that is configured to decode and play a video, for example, an STB.

Optionally, the video service transmission system further includes another network device ensuring IPTV video service quality. For example, a fast channel change (FCC) technology is usually used for a problem of a slow channel change in a current play process of an IPTV video service. In this case, the system further includes an FCC server. For another example, phenomena such as pixelation and erratic display caused by a packet loss are prone to occur in an IPTV video service transmission process. To resolve the packet loss problem, a retransmission (RET) mechanism is usually further used in the video service transmission system. In this case, the system further includes a RET server. The FCC server and the RET server may be deployed on a same physical device, or may be deployed on different physical devices.

It should be noted that FIG. 1 further shows a RET server 105, but shows no FCC server.

In actual application, a video service in the video service transmission system may be carried by using a Real-Time Transport Protocol (RTP) packet. The video stream mentioned in this embodiment of the present disclosure may be an RTP video stream. Each RTP packet is corresponding to one sequence number. Each RTP packet in the RTP video stream may be located based on a value of the sequence number because a sequence number of an RTP packet is one larger than that of a previous RTP packet based on an RTP packet encapsulation sequence. Therefore, the sequence number may be used to detect a packet loss status. When detecting a packet loss or an error packet, the user equipment may send a retransmission request to the retransmission server to request to receive a packet again that is not successfully received in a multicast mode.

Figure 2:
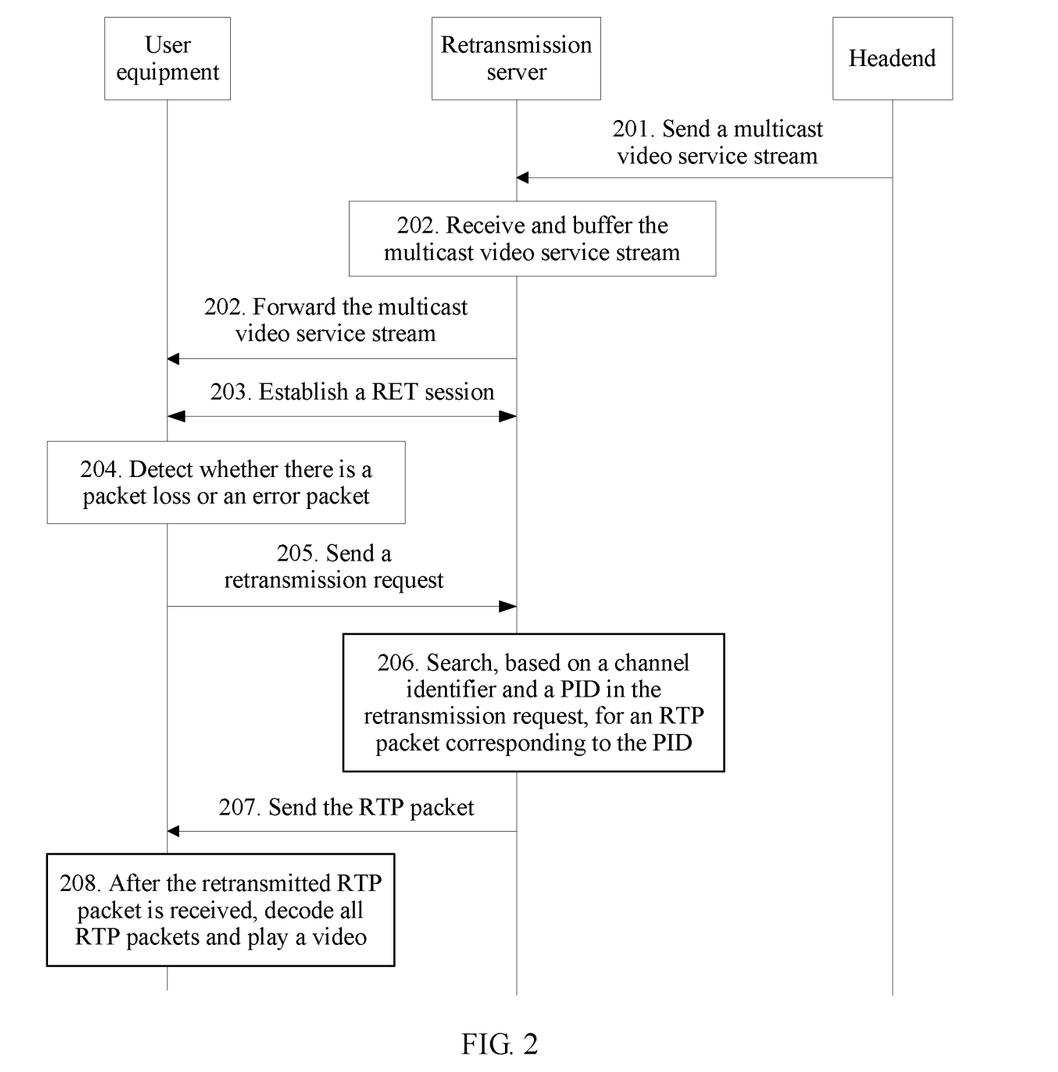
FIG. 2 is a schematic diagram of a specific implementation process of retransmitting a packet by using a retransmission server according to an embodiment of the present disclosure.

As shown in FIG. 2, when the video service transmission system includes the retransmission server, a specific implementation process of retransmitting a packet by using the retransmission server includes the following steps.

201. The headend sends a multicast video service stream to the retransmission server.

202. The retransmission server receives and buffers the multicast video service stream sent by the headend, and forwards the multicast video service stream to the user equipment.

203. The user equipment and the retransmission server establish a session (RET session) used to retransmit a packet with each other.

204. The user equipment detects whether there is a packet loss or an error packet.

If a packet loss or an error packet is found, step 205 and subsequent steps are performed.

205. The user equipment sends a retransmission request to the retransmission server in a unicast mode.

Internet Engineering Task Force (IETF) RFC 4585 defines a specific implementation form of the retransmission request. The retransmission request may be an RTP Control Protocol (RTCP) NACK request. In addition, according to RFC 4585, one RTCP NACK request packet may be used to request to retransmit a plurality of RTP packets.

206. The retransmission server searches, based on a channel identifier and a packet identifier (PID) in the received retransmission request, for an RTP packet buffered in a video stream buffer area of a corresponding channel.

In addition, IETF RFC 4588 further defines an RTP encapsulation format of a retransmitted packet.

207. The retransmission server sends the RTP packet corresponding to the PID in the retransmission request to the user equipment if the retransmission server finds the RTP packet.

208. After receiving the retransmitted RTP packet, the user equipment decodes all RTP packets and plays a video.

Figure 3:
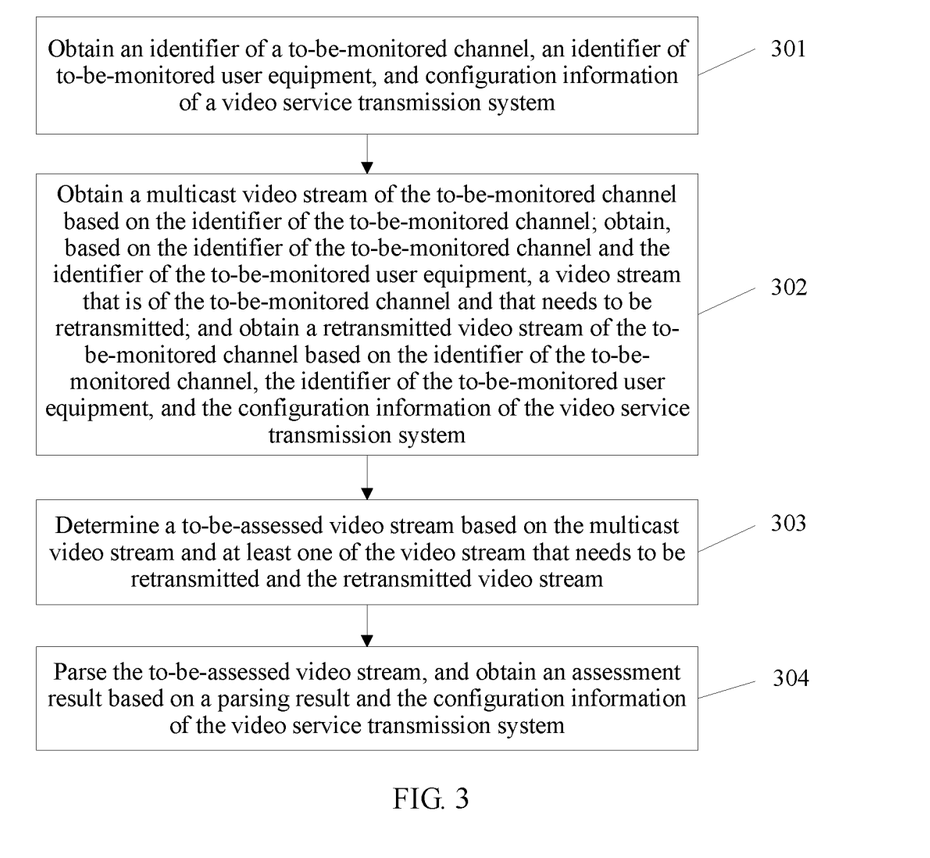
FIG. 3 is a schematic flowchart of a video service quality assessment method according to an embodiment of the present disclosure.

As shown in FIG. 3, an embodiment of the present disclosure provides a video service quality assessment method. The method may be applied to the video service transmission system shown in FIG. 1 and the application scenario shown in FIG. 2. The method may be performed by a monitoring device in the video service transmission system. The method includes the following steps.

301. Obtain an identifier of a to-be-monitored channel, an identifier of to-be-monitored user equipment, and configuration information of the video service transmission system.

The identifier of the to-be-monitored channel may be a channel number of the to-be-monitored channel, a synchronous source (SSRC) identifier (ID) corresponding to the to-be-monitored channel, or the like. The identifier of the to-be-monitored user equipment may be an IP address or the like of the to-be-monitored user equipment.

The configuration information of the video service transmission system includes an identifier of each device included in the video service transmission system, such as an IP address. Optionally, the configuration information of the video service transmission system further includes a video coding configuration parameter of a headend, such as a coding type, a frame rate, and a resolution, a buffer capacity of the to-be-monitored user equipment, and a decoding parameter of the to-be-monitored user equipment, such as an error concealment manner. The configuration information may further include other attribute information of the video service transmission system, for example, an error tolerance capability deployed in the transmission system.

Optionally, in a specific implementation process of this step, the identifier of the to-be-monitored channel and the identifier of the to-be-monitored user equipment may be obtained by the monitoring device by using a management device. The configuration information of the video service transmission system may be obtained by the monitoring device by using the management device, or may be obtained by the monitoring device by capturing a video stream or a RET session. For example, when the video stream is not scrambled, the monitoring device may capture and parse the video stream to obtain information such as a coding type, or the monitoring device may capture and parse the RET session to obtain an identifier of a RET server and the like.

302. Obtain a multicast video stream of the to-be-monitored channel based on the identifier of the to-be-monitored channel; obtain, based on the identifier of the to-be-monitored channel and the identifier of the to-be-monitored user equipment, a video stream that is of the to-be-monitored channel and that needs to be retransmitted; and obtain a retransmitted video stream of the to-be-monitored channel based on the identifier of the to-be-monitored channel, the identifier of the to-be-monitored user equipment, and the configuration information of the video service transmission system.

The multicast video stream is a video stream sent by the headend to a multicast group including a plurality of user equipments. The monitoring device may obtain, based on the channel number, the multicast video stream corresponding to the to-be-monitored channel.

The video stream that needs to be retransmitted is a multicast video stream that is not successfully received by the user equipment. For example, if the user equipment has not received any packets because a packet loss occurs in a multicast video stream transmission process, these packets form the video stream that needs to be retransmitted.

The retransmitted video stream is a video stream sent, for the purpose of resolving the packet loss problem, by the retransmission server to the user equipment based on a retransmission request of the user equipment after the multicast video stream is sent. The video stream is a video stream that is not successfully received by the user equipment in a multicast mode.

Optionally, the video stream in this embodiment of the present disclosure includes an RTP packet.

303. Determine a to-be-assessed video stream based on the multicast video stream and at least one of the video stream that needs to be retransmitted and the retransmitted video stream.

In a specific implementation process of this step, the to-be-assessed video stream may be determined in the following three manners.

Manner 1: The to-be-assessed video stream is determined by using the multicast video stream and the video stream that needs to be retransmitted.

This implementation is mainly applied to an application scenario in which the video service transmission system does not include the retransmission server. There is no retransmitted video stream because the video service transmission system does not include the retransmission server. In this implementation, because locations of the monitoring device and the user equipment in the video service transmission system are different, a packet loss may occur when the monitoring device transmits the multicast video stream to the user equipment. Therefore, the multicast video stream captured by the monitoring device cannot truly reflect a multicast video stream received on a user equipment side. Therefore, the monitoring device further needs to determine, based on a packet that is not successfully received by the user equipment in the multicast mode, the multicast video stream actually received on the user equipment side. For example, the multicast video stream captured by the monitoring device includes packets 1 to 10, and the video stream of the user equipment that needs to be retransmitted includes packets 2 and 3 based on the retransmission request sent by the user equipment, that is, the user equipment actually has not received the packets 2 and 3. In this case, the multicast video stream actually received by the user equipment includes packets 1, and 4 to 10. Therefore, the video stream actually received on the user equipment side in the multicast mode is obtained through estimation by using the multicast video stream and the video stream that needs to be retransmitted, and the video stream is determined as the to-be-assessed video stream.

Manner 2: The to-be-assessed video stream is determined by using the multicast video stream and the retransmitted video stream.

This implementation is mainly applied to an application scenario in which the video service transmission system includes the retransmission server. The retransmission server usually sends, to the user equipment after receiving the retransmission request sent by the user equipment, all data that needs to be retransmitted. In this case, the retransmitted video stream is the same as the video stream that needs to be retransmitted. Therefore, the to-be-assessed video stream determined by using the multicast video stream and the retransmitted video stream can relatively accurately reflect a video stream actually received on a user equipment side.

Manner 3: The to-be-assessed video stream is determined by using the multicast video stream, the video stream that needs to be retransmitted, and the retransmitted video stream.

This implementation is mainly applied to an application scenario in which the video service transmission system includes the retransmission server. In the application scenario, the retransmitted video stream sent by the retransmission server may not be totally the same as the video stream that needs to be retransmitted, for example, when a packet loss occurs again in a retransmission process. In this implementation, a service stream determined by using the multicast video stream and the video stream that needs to be retransmitted is a video stream actually received by the user equipment in the multicast mode, and the retransmitted video stream is a video stream actually received by the user equipment through retransmission. Therefore, the to-be-assessed video stream determined in this implementation can more accurately reflect a video stream actually received by the user equipment than that in the Manner 2.

304. Parse the to-be-assessed video stream, and obtain an assessment result based on a parsing result and the configuration information of the video service transmission system.

The configuration information of the video service transmission system includes the video coding configuration parameter used by the headend to encode a video, such as the coding type, the frame rate, and the resolution, and the decoding parameter of the to-be-monitored user equipment, such as the error concealment manner.

In a specific implementation process of this step, the monitoring device simulates a decoding behavior of the to-be-monitored user equipment based on the decoding parameter, sorts an out-of-order video stream, extracts video frames at a constant speed based on the frame rate or a specific time interval, and obtains attribute information of the video stream, such as a frame type, a frame size, a frame packet loss event, and a lost packet count; then determines a bit rate based on the video coding configuration parameter and the frame size, and determines a video compression impairment; further needs to determine a network transmission impairment based on the decoding parameter, the frame type, the frame size, the frame packet loss event, the lost packet count, and the like; and finally, comprehensively considers the video compression impairment and the network transmission impairment to obtain a final MOS-V.

For a specific implementation process of this step, refer to the prior art, and details are not described herein.

According to the video service quality assessment method provided in this embodiment of the present disclosure, when determining the to-be-assessed video stream, the monitoring device not only obtains the multicast video stream, but also obtains the video stream that needs to be retransmitted and the retransmitted video stream, and determines, based on the multicast video stream and the at least one of the video stream that needs to be retransmitted and the retransmitted video stream, the final video stream used for quality assessment. In the prior art, only a multicast video stream is obtained. By comparison, according to the video service quality assessment method provided in this embodiment of the present disclosure, the at least one of the video stream that needs to be retransmitted and the retransmitted video stream is further considered, and the to-be-assessed video stream can truly reflect a status of receiving a video stream by the user equipment. Therefore, the assessment result obtained based on the to-be-assessed video stream is also relatively accurate.

Optionally, in an implementation of step 302, the obtaining, based on the identifier of the to-be-monitored channel and the identifier of the to-be-monitored user equipment, a video stream that is of the to-be-monitored channel and that needs to be retransmitted includes:

obtaining, based on the identifier of the to-be-monitored channel and the identifier of the to-be-monitored user equipment, a retransmission request corresponding to the to-be-monitored channel that is sent by the to-be-monitored user equipment, where the retransmission request includes an identifier of a packet that needs to be retransmitted; and obtaining, based on the identifier of the packet that needs to be retransmitted, the video stream that needs to be retransmitted.

In actual application, the user equipment performs error and packet loss detection on a received multicast video stream. If the user equipment finds a packet loss or an error packet, the user equipment initiates the retransmission request to the RET server. The retransmission request may include identifiers of a plurality of packets that need to be retransmitted.

In this implementation, the video stream that needs to be retransmitted, to be specific, a packet that is not successfully received by the to-be-monitored user equipment, may be obtained based on the retransmission request sent by the to-be-monitored user equipment. Therefore, the video stream actually received on the user equipment side in the multicast mode can be determined based on the obtained multicast video stream and video stream that needs to be retransmitted.

Optionally, the configuration information of the video service transmission system includes an identifier of each device in the video service transmission system, such as an IP address of the headend and an IP address of the retransmission server. The method further includes: determining, based on the configuration information of the video service transmission system, whether the video service transmission system includes a retransmission server; and if the video service transmission system includes the retransmission server, correspondingly, in an implementation of step 302, the obtaining a retransmitted video stream based on the identifier of the to-be-monitored channel, the identifier of the to-be-monitored user equipment, and the configuration information of the video service transmission system specifically includes:

obtaining an identifier of the retransmission server; obtaining, based on the identifier of the to-be-monitored channel, the identifier of the to-be-monitored user equipment, and the identifier of the retransmission server, a retransmitted packet sent by the retransmission server to the to-be-monitored user equipment; and determining the retransmitted packet as the retransmitted video stream.

Optionally, the identifier of the to-be-monitored user equipment is an IP address of the to-be-monitored user equipment, and the identifier of the retransmission server is an IP address of the retransmission server. In this implementation, if the retransmission server and another device have a same IP address, in a process of determining the retransmitted packet, the retransmitted packet sent by the retransmission server to the to-be-monitored user equipment needs to be determined based on an encapsulation format of a packet used to transmit a video stream in addition to the identifier of the to-be-monitored channel, the IP address of the to-be-monitored user equipment, and the IP address of the retransmission server.

In this implementation, it may be determined, by using the configuration information of the video service transmission system, whether the retransmission server exists in the system. If the retransmission server exists, a packet received by the to-be-monitored user equipment through retransmission, that is, the retransmitted video stream, may be determined based on the retransmitted packet sent by the retransmission server to the to-be-monitored user equipment; or if the retransmission server does not exist, there is no retransmitted video stream. In this way, the to-be-assessed video stream is determined by considering the video stream received through retransmission in addition to the multicast video stream received in the multicast mode. The to-be-assessed video stream determined in this way can truly reflect a video stream actually received by the user equipment, and the assessment result obtained based on the video stream is also relatively accurate.

Optionally, the configuration information of the video service transmission system includes a buffer capacity of the to-be-monitored user equipment. Correspondingly, before the obtaining a multicast video stream, a video stream that needs to be retransmitted, and a retransmitted video stream, the method further includes: disposing a buffer based on the buffer capacity of the to-be-monitored user equipment, where the buffer is configured to buffer the multicast video stream and the retransmitted video stream.

In this implementation, the buffer is disposed based on the buffer capacity of the to-be-monitored user equipment, and is configured to buffer the obtained multicast video stream and retransmitted video stream, so as to simulate a buffer mechanism of the to-be-monitored user equipment. Therefore, in this implementation, the buffer mechanism of the to-be-monitored user equipment is considered in the video service quality assessment method provided in the present disclosure. Therefore, the status of receiving a video stream on the to-be-monitored user equipment side can be more truly reflected, so that accuracy of the assessment result can be further improved.

Figure 4A:
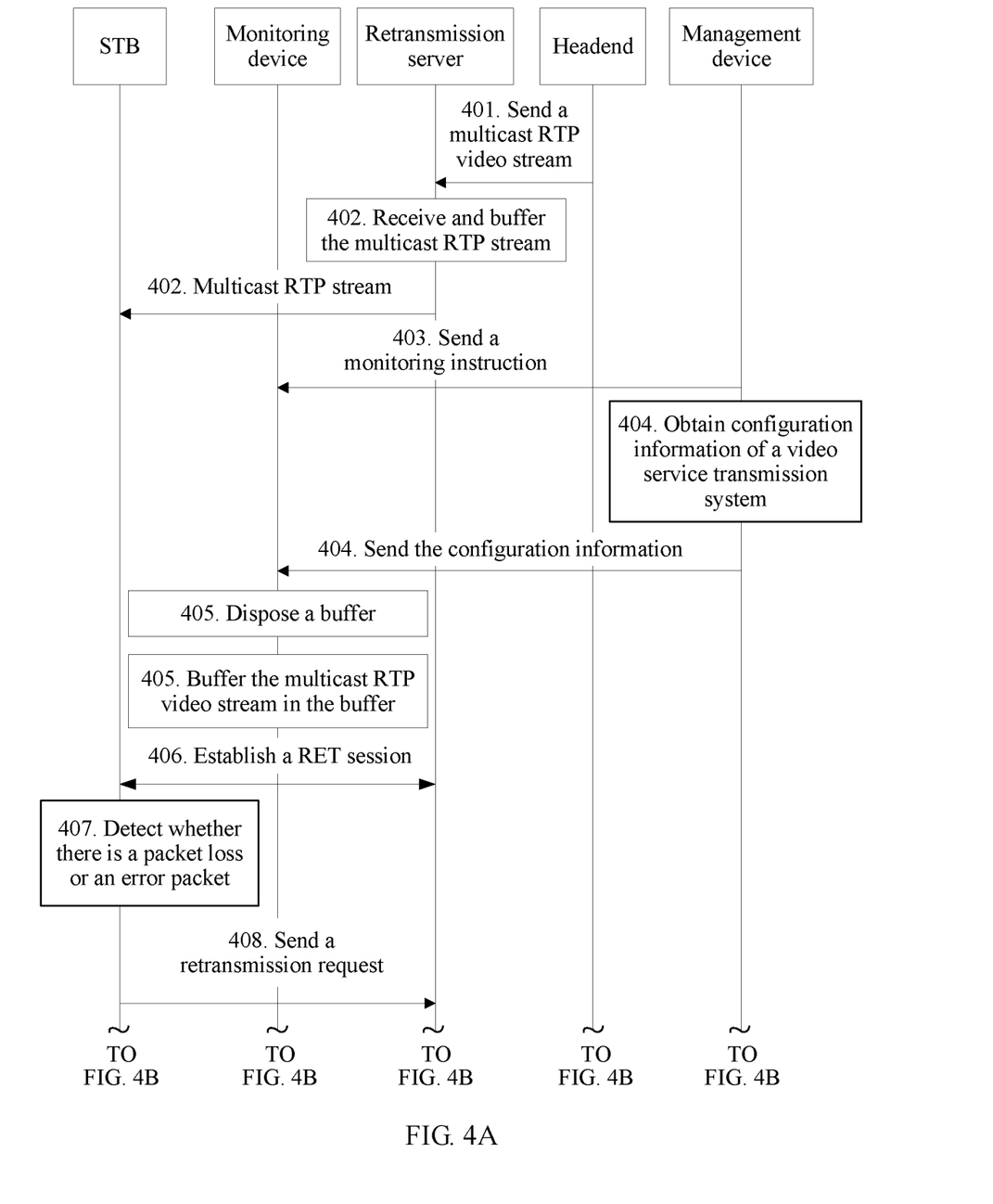
FIG. 4A and FIG. 4B are a schematic flowchart of another video service quality assessment method according to an embodiment of the present disclosure.
Figure 4B:
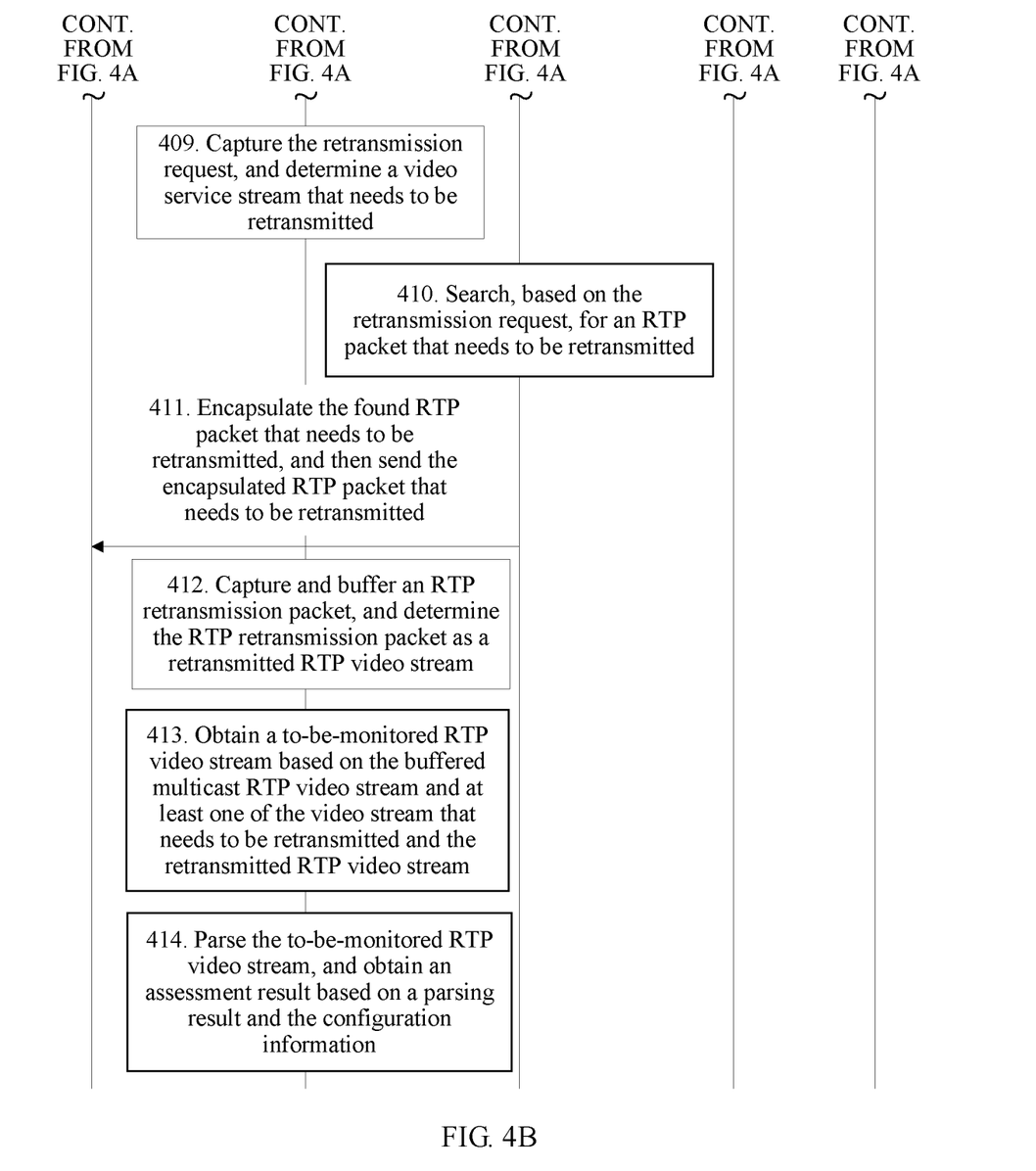

As shown in FIG. 4A and FIG. 4B, for example, the video stream is an RTP video stream and the to-be-monitored user equipment is an STB. An embodiment of the present disclosure further provides a video service quality assessment method. The method may be applied to the video service transmission system shown in FIG. 1 and the application scenario shown in FIG. 2. The method includes the following steps.

401. A headend sends a multicast RTP video stream to a retransmission server.

402. The retransmission server receives and buffers the multicast RTP video stream sent by the headend, and forwards the multicast RTP video stream to an STB.

403. A management device sends a monitoring instruction to a monitoring device, where the monitoring instruction includes an identifier of a to-be-monitored channel and an identifier of the STB.

404. The management device obtains configuration information of the video service transmission system, and sends the configuration information to the monitoring device.

The configuration information includes an identifier of each device, such as an IP address, a video coding configuration parameter of the headend, such as a coding type, a frame rate, and a resolution, a buffer capacity of the STB, and a decoding parameter of the STB, such as an error concealment manner.

An IPTV video service is independently operated and totally controlled by a telecommunications operator, and an IPTV video headend, a STB, and the like are provided by the telecommunications operator for a user. Therefore, the management device may pre-obtain the configuration information of the video service transmission system and send the configuration information to the monitoring device.

405. The monitoring device disposes a buffer based on a buffer capacity of the STB, and buffers the multicast RTP video stream in the buffer.

406. The STB and the retransmission server establish a RET session with each other.

407. The STB detects whether there is a packet loss or an error packet by detecting a sequence number of an RTP packet.

If a packet loss or an error packet is found, step 408 and subsequent steps are performed.

408. The STB sends a retransmission request to the retransmission server.

The retransmission request includes an identifier of an RTP packet that needs to be retransmitted.

409. The monitoring device captures the retransmission request, and obtains, based on an identifier that is carried in the request and that is of an RTP packet that needs to be retransmitted, a video stream that needs to be retransmitted.

410. The retransmission server searches a video stream buffer area of the corresponding channel based on a channel identifier and a packet identifier in the received retransmission request.

411. If the retransmission server finds an RTP packet corresponding to the packet identifier, the retransmission server encapsulates the found RTP packet and then sends the encapsulated RTP packet to the STB.

412. The monitoring device captures and buffers a unicast RTP retransmission packet sent by the retransmission server to the STB.

413. The monitoring device obtains a to-be-monitored RTP video stream based on the buffered multicast RTP video stream and at least one of the video stream that needs to be retransmitted and the retransmitted unicast RTP video stream.

414. The monitoring device parses the to-be-monitored RTP video stream, and obtains an assessment result of the to-be-monitored RTP video stream based on a parsing result and the configuration information.

According to the video service quality assessment method provided in this embodiment of the present disclosure, when determining a to-be-assessed video stream, the monitoring device not only obtains the multicast video stream, but also obtains the video stream that needs to be retransmitted and the retransmitted video stream, and determines, based on the multicast video stream and the at least one of the video stream that needs to be retransmitted and the retransmitted video stream, the final video stream used for quality assessment. In the prior art, only a multicast video stream is obtained. By comparison, according to the video service quality assessment method provided in this embodiment of the present disclosure, the at least one of the video stream that needs to be retransmitted and the retransmitted video stream is further considered, and the to-be-assessed video stream can truly reflect a status of receiving a video stream by the user equipment. Therefore, the assessment result obtained based on the to-be-assessed video stream is also relatively accurate.

Figure 5:
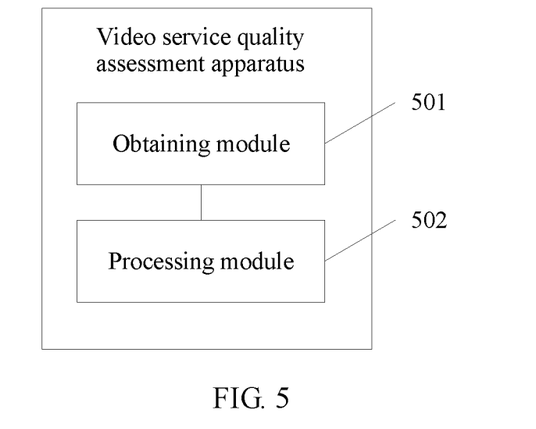
FIG. 5 is a schematic structural diagram of a video service quality assessment apparatus according to an embodiment of the present disclosure.

As shown in FIG. 5, an embodiment of the present disclosure provides a video service quality assessment apparatus, configured to perform the method in either of the embodiments in FIG. 3 and FIG. 4A and FIG. 4B. The apparatus includes an obtaining module 501 and a processing module 502.

The obtaining module 501 is configured to obtain an identifier of a to-be-monitored channel, an identifier of to-be-monitored user equipment, and configuration information of a video service transmission system.

The obtaining module 501 may be a physical device or a virtual module that can implement the foregoing function. In specific application, for a specific processing process of the obtaining module 501, refer to step 301 described above, and details are not described herein again.

The processing module 502 is configured to: obtain a multicast video stream of the to-be-monitored channel based on the identifier of the to-be-monitored channel; obtain, based on the identifier of the to-be-monitored channel and the identifier of the to-be-monitored user equipment, a video stream that is of the to-be-monitored channel and that needs to be retransmitted; obtain a retransmitted video stream of the to-be-monitored channel based on the identifier of the to-be-monitored channel, the identifier of the to-be-monitored user equipment, and the configuration information of the video service transmission system; determine a to-be-assessed video stream based on the multicast video stream and at least one of the video stream that needs to be retransmitted and the retransmitted video stream; and parse the to-be-assessed video stream, and obtain an assessment result based on a parsing result and the configuration information of the video service transmission system.

The processing module 502 may be a physical device or a virtual module that can implement the foregoing function. In specific application, for a specific processing process of the processing module 502, refer to step 302 to step 304 described above, and details are not described herein again.

According to the video service quality assessment apparatus provided in this embodiment of the present disclosure, when determining the to-be-assessed video stream, the processing module not only obtains the multicast video stream, but also obtains the at least one of the video stream that needs to be retransmitted and the retransmitted video stream, and determines, based on the multicast video stream and the at least one of the video stream that needs to be retransmitted and the retransmitted video stream, the final video stream used for quality assessment. In the prior art, only a multicast video stream is obtained. By comparison, the video service quality assessment apparatus provided in the present disclosure further considers the at least one of the video stream that needs to be retransmitted and the retransmitted video stream, and the to-be-assessed video stream can truly reflect a status of receiving a video stream by the user equipment. Therefore, the assessment result obtained based on the to-be-assessed video stream is also relatively accurate.

Optionally, the processing module 502 is specifically configured to: obtain, based on the identifier of the to-be-monitored channel and the identifier of the to-be-monitored user equipment, a retransmission request corresponding to the to-be-monitored channel that is sent by the to-be-monitored user equipment, where the retransmission request includes an identifier of a packet that needs to be retransmitted; and obtain, based on the identifier of the packet that needs to be retransmitted, the video stream that needs to be retransmitted.

Optionally, the processing module 502 is further configured to: when the configuration information of the video service transmission system includes an identifier of each device in the video service transmission system, determine, based on the configuration information of the video service transmission system, whether the video service transmission system includes a retransmission server; when the video service transmission system includes the retransmission server, obtain an identifier of the retransmission server; obtain, based on the identifier of the to-be-monitored channel, the identifier of the to-be-monitored user equipment, and the identifier of the retransmission server, a retransmitted packet sent by the retransmission server to the to-be-monitored user equipment; and determine the retransmitted packet as the retransmitted video stream.

Optionally, the processing module 502 is further configured to: when the identifier of the to-be-monitored user equipment is an IP address of the to-be-monitored user equipment, the identifier of the retransmission server is an IP address of the retransmission server, and the retransmission server and another device have a same IP address, determine, based on the identifier of the to-be-monitored channel, the IP address of the to-be-monitored user equipment, the IP address of the retransmission server, and an encapsulation format of a packet used to transmit a video stream, the retransmitted packet sent by the retransmission server to the to-be-monitored user equipment.

Optionally, the processing module 502 is further configured to: when the configuration information of the video service transmission system includes a buffer capacity of the to-be-monitored user equipment, dispose a buffer based on the buffer capacity of the to-be-monitored user equipment, where the buffer is configured to buffer the multicast video stream and the retransmitted video stream.

It should be noted that, in the embodiments provided in this application, it should be understood that the disclosed system, apparatus, and method may be implemented in other manners. For example, the apparatus embodiment described above is merely an example. For example, division of the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, that is, may be located in one position, or may be distributed on a plurality of network modules. Some or all of the modules may be selected according to actual needs to achieve the objectives of the solutions of the embodiments.

In addition, function modules in the embodiments of the present disclosure may exist alone physically, or two or more modules may be integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of the present disclosure. The storage medium includes: any medium that can store program code, such as a USB flash drive, a removable hard disk, a read-only memory, a random access memory (RAM), a magnetic disk, or an optical disc.

Figure 6:
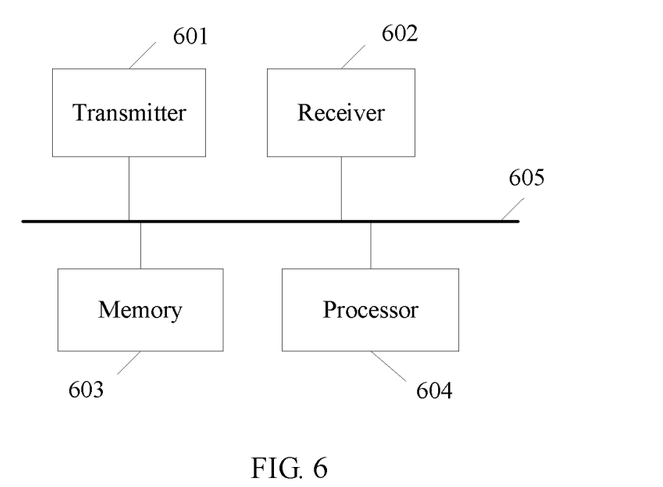
FIG. 6 is a schematic structural diagram of another video service quality assessment apparatus according to an embodiment of the present disclosure.

As shown in FIG. 6, an embodiment of the present disclosure provides a video service quality assessment apparatus. The apparatus may be a monitoring device, and is configured to perform the method in either of the embodiments in FIG. 3 and FIG. 4A and FIG. 4B. The apparatus includes a transmitter 601, a receiver 602, a memory 603, a processor 604, and a bus 605. The transmitter 601, the receiver 602, the memory 603, and the processor 604 are connected to each other by using the bus 605.

The transmitter 601 is configured to send data to another device under the control of the processor 604.

The receiver 602 is configured to receive, under the control of the processor 604, data sent by the another device.

The memory 603 is configured to store program code.

The processor 604 is configured to execute the program code, so as to implement the method shown in FIG. 3 or FIG. 4A and FIG. 4B.

When determining a to-be-assessed video stream, the video service quality assessment apparatus provided in the present disclosure not only obtains a multicast video stream, but also obtains at least one of a video stream that needs to be retransmitted and a retransmitted video stream, and determines, based on the multicast video stream and the at least one of the video stream that needs to be retransmitted and the retransmitted video stream, the final video stream used for quality assessment. In the prior art, only a multicast video stream is obtained. By comparison, the video service quality assessment apparatus provided in the present disclosure further considers the at least one of the video stream that needs to be retransmitted and the retransmitted video stream, and the to-be-assessed video stream can truly reflect a status of receiving a video stream by user equipment. Therefore, an assessment result obtained based on the to-be-assessed video stream is also relatively accurate.

It should be noted that the memory 603 described in this embodiment of the present disclosure may be a storage apparatus, or may be a collective term for a plurality of storage elements, and is configured to store executable program code and the like. In addition, the memory may include a RAM or a ROM, or may include a non-volatile memory, such as a magnetic disk memory or a flash.

The processor 604 may be a processor, or may be a collective term for a plurality of processing elements. For example, the processor may be a central processing unit (CPU), or may be an application-specific integrated circuit (ASIC), or may be one or more integrated circuits configured to implement the embodiments of the present disclosure, for example, one or more digital signal processors (DSP) or one or more field-programmable gate arrays (FPGA).

The bus 605 may be an industry standard architecture (ISA) bus, a peripheral component interconnect (PCI) bus, an extended industry standard architecture (EISA) bus, or the like. The bus 605 may fall into an address bus, a data bus, a control bus, and the like. For ease of representation, only one thick line is used to represent the bus in FIG. 6, but this does not mean that there is only one bus or only one type of bus.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A video service quality assessment apparatus comprising:
a processor; and
a non-transitory computer readable medium comprising computer-executable instructions which, when executed by the processor, cause the apparatus to:
obtain an identifier of a to-be-monitored channel, an identifier of to-be-monitored user equipment, and configuration information of a video service transmission system;
obtain a multicast video stream of the to-be-monitored channel based on the identifier of the to-be-monitored channel;
obtain a retransmitted video stream of the to-be-monitored channel based on the identifier of the to-be-monitored channel, the identifier of the to-be-monitored user equipment, and the configuration information of the video service transmission system;
determine a to-be-assessed video stream based on the multicast video stream and the retransmitted video stream;
parse the to-be-assessed video stream; and
obtain an assessment result of the to-be-assessed video stream based on a parsing result and the configuration information of the video service transmission system.

2. The apparatus according to claim 1, wherein the computer-executable instructions, when executed by the processor, cause the apparatus to:
obtain, based on the identifier of the to-be-monitored channel and the identifier of the to-be-monitored user equipment, a video stream that is of the to-be-monitored channel and that needs to be retransmitted; and
determine the to-be-assessed video stream based on the multicast video stream, the retransmitted video stream, and the video stream that needs to be retransmitted.

3. The apparatus according to claim 2, wherein to obtain the video stream that is of the to-be-monitored channel and that needs to be retransmitted, the computer-executable instructions, when executed by the processor, further cause the apparatus to:
obtain, based on the identifier of the to-be-monitored channel and the identifier of the to-be-monitored user equipment, a retransmission request corresponding to the to-be-monitored channel that is from the to-be-monitored user equipment, wherein the retransmission request comprises an identifier of a packet that needs to be retransmitted; and
obtain, based on the identifier of the packet that needs to be retransmitted, the video stream that needs to be retransmitted.

4. The apparatus according to claim 1, wherein the configuration information of the video service transmission system comprises an identifier of each device in the video service transmission system, wherein the computer-executable instructions, when executed by the processor, cause the apparatus to:
determine, based on the configuration information of the video service transmission system, whether the video service transmission system comprises a retransmission server, and
obtain an identifier of the retransmission server when the video service transmission system comprises the retransmission server,
wherein to obtain the retransmitted video stream of the to-be-monitored channel, the computer-executable instructions, when executed by the processor, further cause the apparatus to:
obtain, based on the identifier of the to-be-monitored channel, the identifier of the to-be-monitored user equipment, and the identifier of the retransmission server, a retransmitted packet from the retransmission server to the to-be-monitored user equipment; and
determine the retransmitted packet as the retransmitted video stream.

5. The apparatus according to claim 4, wherein the identifier of the to-be-monitored user equipment is an Internet Protocol (IP) address of the to-be-monitored user equipment, and wherein the identifier of the retransmission server is an IP address of the retransmission server, and wherein to obtain the retransmitted packet from the retransmission server to the to-be-monitored user equipment when the retransmission server and another device have a same IP address, the computer-executable instructions, when executed by the processor, further cause the apparatus to determine, based on the identifier of the to-be-monitored channel, the IP address of the to-be-monitored user equipment, the IP address of the retransmission server, and an encapsulation format of a packet used to transmit a video stream, the retransmitted packet from the retransmission server to the to-be-monitored user equipment.

6. The apparatus according to claim 1, wherein the configuration information of the video service transmission system comprises a buffer capacity of the to-be-monitored user equipment, and before obtaining a tip, multicast video stream and the retransmitted video stream of the to-be-monitored channel, the computer-executable instructions computer-executable instructions, when executed by the processor, cause the apparatus to dispose of a buffer based on the buffer capacity of the to-be-monitored user equipment, wherein the buffer is configured to buffer the multicast video stream and the retransmitted video stream.

7. The apparatus according to claim 1, wherein the multicast video stream is an Internet Protocol television (IPTV) video stream to be received by the to-be-monitored user equipment in a multicast mode.

8. The apparatus according to claim 1, wherein the video stream that needs to be retransmitted comprises packets of the multicast video stream that were not successfully received by the to-be-monitored user equipment.

9. The apparatus according to claim 2, wherein the assessment result is a mean opinion score of video (MOS-V).

10. A video service quality assessment apparatus comprising:
a processor; and
a non-transitory computer readable medium comprising computer-executable instructions which, when executed by the processor, cause the apparatus to:
obtain an identifier of a to-be-monitored channel, an identifier of to-be-monitored user equipment, and configuration information of a video service transmission system;
obtain a multicast video stream of the to-be-monitored channel based on the identifier of the to-be-monitored channel;
obtain, based on the identifier of the to-be-monitored channel and the identifier of the to-be-monitored user equipment, a video stream that is of the to-be-monitored channel and that needs to be retransmitted;
determine a to-be-assessed video stream based on the multicast video stream and the video stream that needs to be retransmitted;
parse the to-be-assessed video stream; and
obtain an assessment result of the to-be-assessed video stream based on a parsing result and the configuration information of the video service transmission system.

11. The apparatus according to claim 10, wherein to obtain the video stream that is of the to-be-monitored channel and that needs to be retransmitted, the computer-executable instructions, when executed by the processor, cause the apparatus to:
obtain, based on the identifier of the to-be-monitored channel and the identifier of the to-be-monitored user equipment, a retransmission request corresponding to the to-be-monitored channel that is from the to-be-monitored user equipment, wherein the retransmission request comprises an identifier of a packet that needs to be retransmitted; and
obtain, based on the identifier of the packet that needs to be retransmitted, the video stream that needs to be retransmitted.

12. A video service quality assessment method, comprising:
obtaining an identifier of a to-be-monitored channel, an identifier of to-be-monitored user equipment, and configuration information of a video service transmission system;
obtaining a multicast video stream of the to-be-monitored channel based on the identifier of the to-be-monitored channel;
obtaining at least one of:
a video stream that is of the to-be-monitored channel and that needs to be retransmitted, or
a retransmitted video stream of the to-be-monitored channel, based on the identifier of the to-be-monitored channel and the identifier of the to-be-monitored user equipment;
determining a to-be-assessed video stream based on the multicast video stream and at least one of: the video stream that needs to be retransmitted or the retransmitted video stream;
parsing the to-be-assessed video stream; and
obtaining an assessment result based on a parsing result and the configuration information of the video service transmission system.

13. The method according to claim 12, wherein obtaining the video stream that needs to be retransmitted comprises:
obtaining, based on the identifier of the to-be-monitored channel and the identifier of the to-be-monitored user equipment, a retransmission request corresponding to the to-be-monitored channel that is from the to-be-monitored user equipment, wherein the retransmission request comprises an identifier of a packet that needs to be retransmitted; and
obtaining, based on the identifier of the packet that needs to be retransmitted, the video stream that needs to be retransmitted.

14. The method according to claim 12, wherein the retransmitted video stream of the to-be-monitored channel is obtained based on the identifier of the to-be-monitored channel, the identifier of the to-be-monitored user equipment, and the configuration information of the video service transmission system.

15. The method according to claim 14, wherein the configuration information of the video service transmission system comprises an identifier of each device in the video service transmission system, wherein the method further comprises:
determining, based on the configuration information of the video service transmission system, whether the video service transmission system comprises a retransmission server; and
obtaining an identifier of the retransmission server when the video service transmission system comprises the retransmission server, wherein obtaining the identifier of the retransmission server and the retransmitted video stream further comprises:
obtaining, based on the identifier of the to-be-monitored channel, the identifier of the to-be-monitored user equipment, and the identifier of the retransmission server, a retransmitted packet from the retransmission server to the to-be-monitored user equipment; and
determining the retransmitted packet as the retransmitted video stream.

16. The method according to claim 15, wherein the identifier of the to-be-monitored user equipment is an Internet Protocol (IP) address of the to-be-monitored user equipment, and where the identifier of the retransmission server is an IP address of the retransmission server, wherein when the retransmission server and another device have a same IP address, obtaining the retransmitted packet from the retransmission server to the to-be-monitored user equipment comprises determining, based on the identifier of the to-be-monitored channel, the IP address of the to-be-monitored user equipment, the IP address of the retransmission server, and an encapsulation format of a packet used to transmit a video stream, the retransmitted packet from the retransmission server to the to-be-monitored user equipment.

17. The method according to claim 12, wherein the configuration information of the video service transmission system comprises a buffer capacity of the to-be-monitored user equipment, wherein before obtaining the multicast video stream and the retransmitted video stream of the to-be-monitored channel, the method further comprises disposing of a buffer based on the buffer capacity of the to-be-monitored user equipment, and wherein the buffer is configured to buffer the multicast video stream and the retransmitted video stream.

* * * * *

UNITED STATES PATENT AND TRADEMARK OFFICE
CERTIFICATE OF CORRECTION

PATENT NO. : 11,006,185 B2
APPLICATION NO. : 16/221011
DATED : May 11, 2021
INVENTOR(S) : Jie Xiong, Youqing Yang and Qiujie Fu It is certified that error appears in the above-identified patent and that said Letters Patent is hereby corrected as shown below:

On the Title Page (71) Applicant: "Guangdong (CN)" should read "Shenzhen, Guangdong (CN)"

In the Claims

Claim 6, Column 18, Line 33: "before obtaining a tip, multicast video" should read "before obtaining the multicast video"

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*